(12) United States Patent
Suzuki

(10) Patent No.: US 10,672,134 B2
(45) Date of Patent: Jun. 2, 2020

(54) IMAGE PROCESSING APPARATUS, IMAGING APPARATUS, IMAGE PROCESSING METHOD, AND STORAGE MEDIUM STORING IMAGE PROCESSING PROGRAM

(71) Applicant: OLYMPUS CORPORATION, Hachioji-shi, Tokyo (JP)

(72) Inventor: Hiroshi Suzuki, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 58 days.

(21) Appl. No.: 15/665,475

(22) Filed: Aug. 1, 2017

(65) Prior Publication Data
US 2018/0033154 A1 Feb. 1, 2018

(30) Foreign Application Priority Data

Aug. 1, 2016 (JP) .................................. 2016-151328

(51) Int. Cl.
*G06T 7/32* (2017.01)
*G06T 5/00* (2006.01)
(Continued)

(52) U.S. Cl.
CPC ................ *G06T 7/32* (2017.01); *G06T 5/002* (2013.01); *G06T 5/008* (2013.01); *G06T 5/40* (2013.01);
(Continued)

(58) Field of Classification Search
CPC .. G06T 7/32; G06T 5/40; G06T 5/008; G06T 5/002; G06T 7/41; G06T 2207/20208;
(Continued)

(56) References Cited

U.S. PATENT DOCUMENTS

2007/0286533 A1* 12/2007 Harada .................... G09G 5/10
382/309
2010/0246967 A1*  9/2010 Ando ...................... G06T 5/009
382/190
2012/0301034 A1* 11/2012 Fukunaga .............. H04N 1/407
382/195

FOREIGN PATENT DOCUMENTS

JP        4111697 B2     7/2008
JP        2013-58202 A   3/2013

OTHER PUBLICATIONS

Office Action issued in Chinese Patent Application No. 201710622934.2 dated Aug. 2, 2019, consisting of 36 pp. (English Translation Provided).

* cited by examiner

*Primary Examiner* — John W Lee
(74) *Attorney, Agent, or Firm* — Volpe and Koenig, P.C.

(57) ABSTRACT

An image processing apparatus includes a deterioration degree estimation unit, a statistical information calculation unit, a correction coefficient calculation unit, and a contrast correction unit. The deterioration degree estimation unit estimates a deterioration degree of each local region of image data. The statistical information calculation unit calculates at least a luminance of a high luminance portion in a luminance distribution of the image data from statistical information of each local region of the image data. The correction coefficient calculation unit calculates a correction coefficient to perform contrast correction. The contrast correction unit performs the contrast correction for each local region of the image data on the basis of the correction coefficient calculated by the correction coefficient calculation unit.

21 Claims, 11 Drawing Sheets

(51) Int. Cl.
*G06T 7/41* (2017.01)
*G06T 5/40* (2006.01)

(52) U.S. Cl.
CPC ...... *G06T 7/41* (2017.01); *G06T 2207/10024* (2013.01); *G06T 2207/20012* (2013.01); *G06T 2207/20172* (2013.01); *G06T 2207/20204* (2013.01); *G06T 2207/20208* (2013.01)

(58) Field of Classification Search
CPC . G06T 2207/10024; G06T 2207/20012; G06T 2207/20204; G06T 2207/20172
See application file for complete search history.

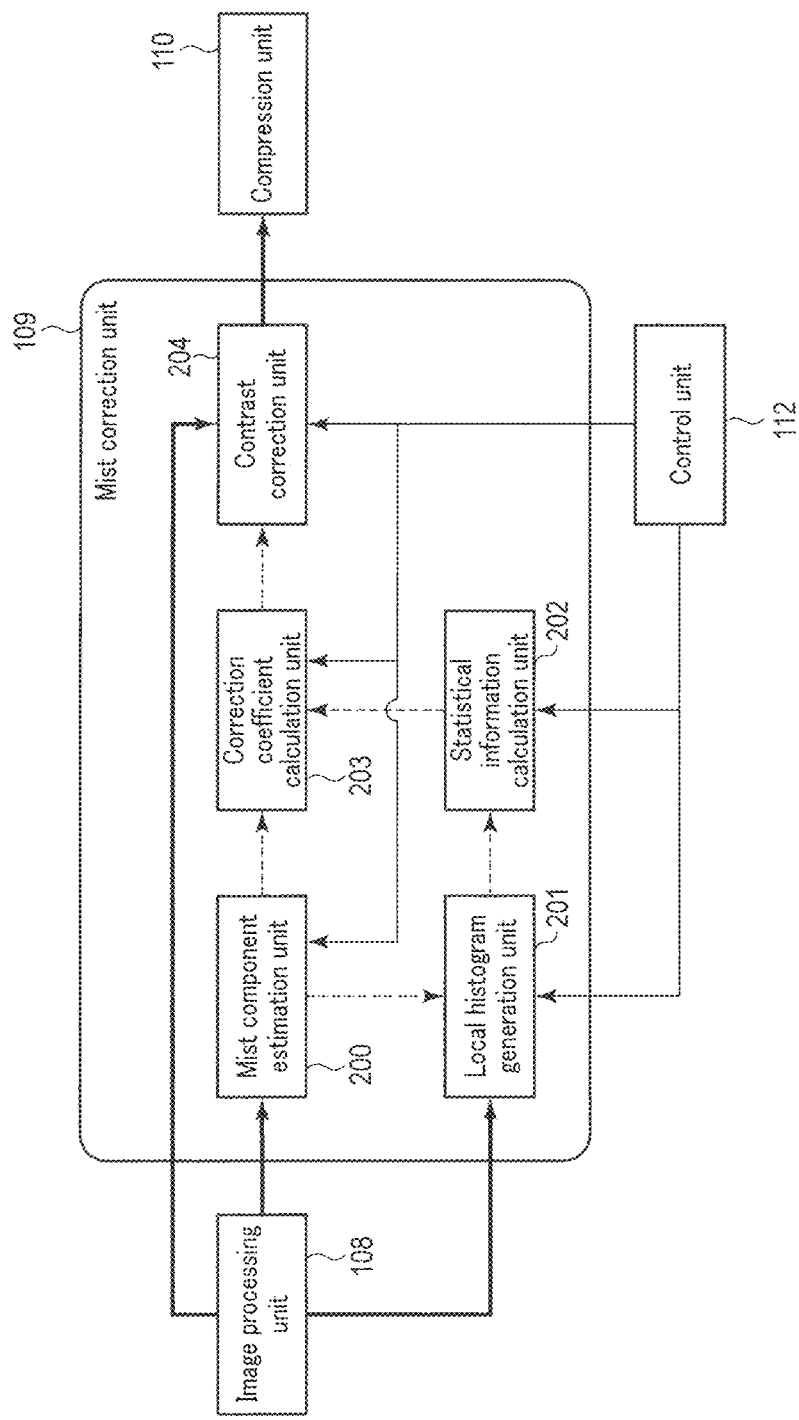
F I G. 2

IMAGE PROCESSING APPARATUS, IMAGING APPARATUS, IMAGE PROCESSING METHOD, AND STORAGE MEDIUM STORING IMAGE PROCESSING PROGRAM

CROSS-REFERENCE TO RELATED APPLICATIONS

This application is based upon and claims the benefit of priority from the prior Japanese Patent Application No. 2016-151328, filed Aug. 1, 2016, the entire contents of which are incorporated herein by reference.

BACKGROUND OF THE INVENTION

1. Field of Invention

The present invention relates to an image processing apparatus, an imaging apparatus, an image processing method, and a storage medium storing an image processing program which correct an image where image quality of contrast, colors or the like is impaired due to an influence of, e. g., mist, haze, or fog.

2. Description of Related Art

Image quality of contrast, colors or the like of an image is impaired due to an influence of mist, haze, fog or the like produced in the atmosphere in some cases. For example, there is a case where a landscape photograph of a distant mountain or the like is taken outdoors. When the distant mountain is misty in this photography, image quality of an acquired image is impaired. Due to this deterioration of image quality, visibility of the distant mountain is lowered.

As a technology to solve such a problem, there is, for example, a technology in Jpn. Pat. Appln. KOKAI Publication No. 2013-058202. In a fog (mist) removing method suggested in this Jpn. Pat. Appln. KOKAI Publication No. 2013-058202, contrast correction corresponding to density of fog is performed by using prior information called dark channel prior.

BRIEF SUMMARY OF THE INVENTION

According to a first aspect of the invention, there is provided an image processing apparatus which corrects image data in accordance with a deterioration degree of image quality of the image data, comprising: a deterioration degree estimation unit which estimates the deterioration degree of each local region of the image data; a statistical information calculation unit which calculates at least a luminance of a high luminance portion in a luminance distribution of the image data from statistical information of each local region of the image data; a correction coefficient calculation unit which calculates a correction coefficient to perform contrast correction which shifts a luminance other than a luminance of the high luminance portion to a low luminance side, while suppressing a fluctuation in the luminance of the high luminance portion in accordance with the deterioration degree of each local region estimated by the deterioration degree estimation unit; and a contrast correction unit which performs the contrast correction for each local region of the image data on the basis of the correction coefficient calculated by the correction coefficient calculation unit.

According to a second aspect of the invention, there is provided an image processing method which corrects image data in accordance with a deterioration degree of image quality of the image data, comprising: estimating the deterioration degree of each local region of the image data; calculating at least a luminance of a high luminance portion in a luminance distribution of the image data from statistical information of each local region of the image data; calculating a correction coefficient to perform contrast correction which shifts a luminance other than a luminance of the high luminance portion to a low luminance side, while suppressing a fluctuation in the luminance of the high luminance portion in accordance with the estimated deterioration degree of each local region; and performing the contrast correction for each local region of the image data on the basis of the calculated correction coefficient.

According to a third aspect of the invention, there is provided a computer-readable non-temporary storage medium which stores image processing program to correct image data in accordance with a deterioration degree of image quality of the image data, the image processing program which is performed by the computer and comprises: estimating the deterioration degree of each local region of the image data; calculating at least a luminance of a high luminance portion in a luminance distribution of the image data from statistical information of each local region of the image data; calculating a correction coefficient to perform contrast correction which shifts a luminance other than a luminance of the high luminance portion to a low luminance side, while suppressing a fluctuation in the luminance of the high luminance portion in accordance with the estimated deterioration degree of each local region; and performing the contrast correction for each local region of the image data on the basis of the calculated correction coefficient.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a configuration of a mist correction unit in a first embodiment;

DETAILED DESCRIPTION OF THE INVENTION

Embodiments according to the present invention will now be described hereinafter with reference to the drawings.

First Embodiment

Figure 1:
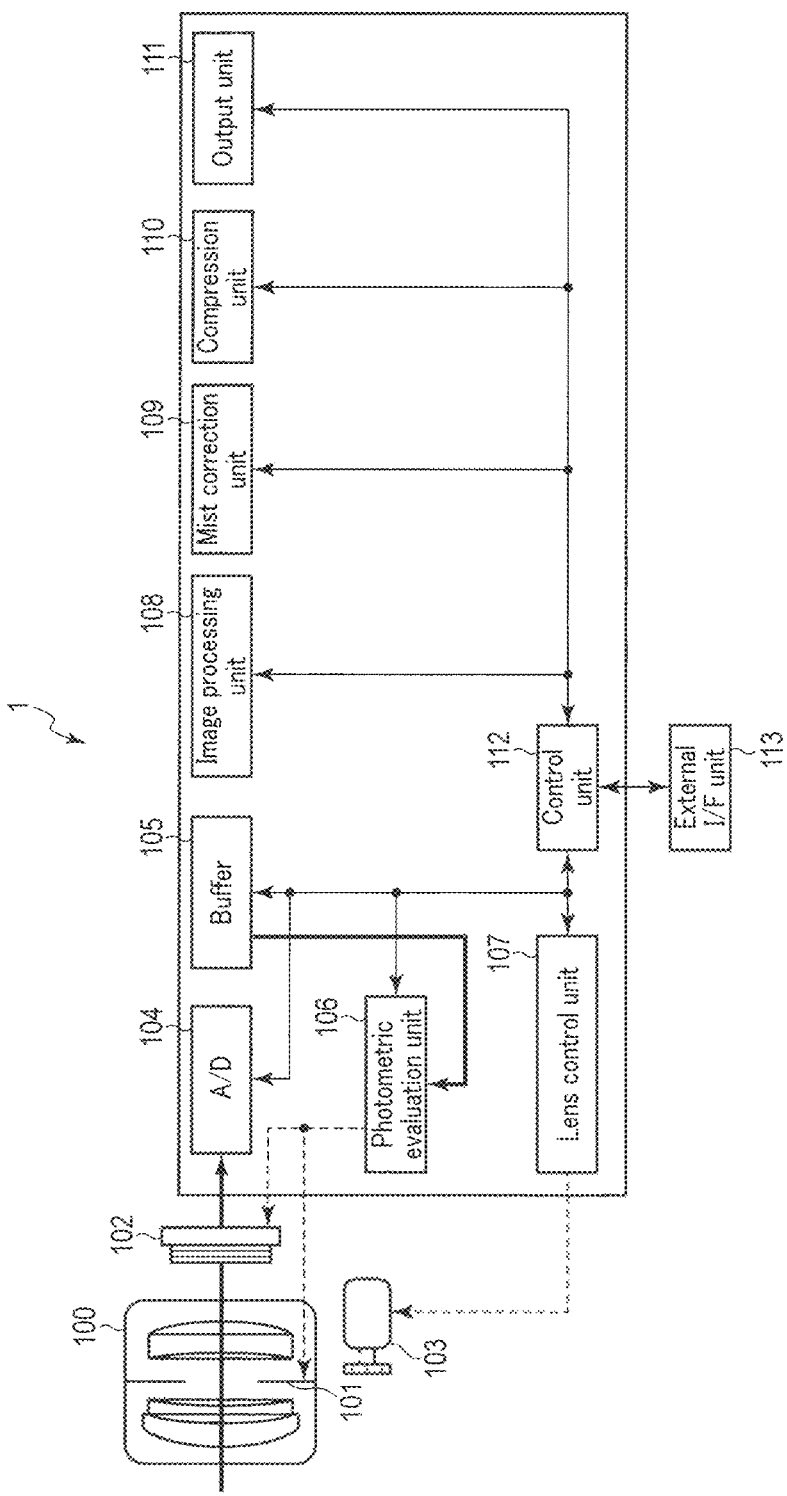
FIG. 1 is a block diagram showing a configuration of an imaging apparatus which is an application example of an image processing apparatus according to each embodiment of the present invention.

A first embodiment according to the present invention will be first described with reference to the drawings. FIG. 1 is a block diagram showing a configuration of an imaging apparatus which is an application example of an image processing apparatus according to each embodiment of the present invention. In FIG. 1, thick solid lines indicate flows of a video signal, thin solid lines indicate flows of a control signal, and broken lines indicate flows of other signals.

An imaging apparatus 1 comprises a lens system 100, an imaging sensor 102, an autofocus motor (an AF motor) 103, an A/D converter 104, a buffer 105, a photometric evaluation unit 106, a lens control unit 107, an image processing unit 108, a mist correction unit 109, a compression unit 110, an output unit 111, a control unit 112, and an external I/F unit 113.

The lens system 100 includes a focus lens, a diaphragm 101, and the like. The lens system 100 forms an optical image from a subject on the imaging sensor 102. The focus lens moves along an optical axis to adjust a focal state of the lens system 100. The diaphragm 101 is opened or closed to limit an amount of a light ray which enters the imaging sensor 102.

The AF motor 103 is controlled by the lens control unit 107, and drives the focus lens in the lens system 100.

The imaging sensor 102 is provided on an optical axis of the lens system 100. The imaging sensor 102 receives the optical image from the lens system 100, and generates an analog video signal of RGB. The A/D converter 104 converts the analog video signal output from the imaging sensor 102 into a digital video signal.

The buffer 105 is, e.g., an SDRAM, and temporarily stores various kinds of signals, e.g., the digital video signal transferred from the A/D converter 104.

The photometric evaluation unit 106 sets an opening amount of the diaphragm 101 in the lens system 100, an output level of the analog video signal output from the imaging sensor 102, and the like on the basis of a photometric evaluation value obtained from the digital video signal provided by the imaging sensor 102.

The lens control unit 107 includes a CPU or an ASIC, and controls the AF motor 103 in accordance with control of the control unit 112.

The image processing unit 108 executes image processing, e.g., well-known interpolation processing, white balance correction processing, noise reduction processing, or the like to the digital video signal stored in the buffer 105, and outputs the image-processed digital video signal as image data.

The mist correction unit 109 performs contrast correction to a region in which contrast has been lowered due to, e.g., an influence of mist in the image data transferred from the image processing unit 108.

The compression unit 110 performs well-known compression processing, e.g., still image compression in a JPEG system or the like or moving image compression in an MPEG system or the like to the image data transferred from the mist correction unit 109. Further, the compression unit 110 also performs decompression for reproduction of compressed image data.

The output unit 111 displays and outputs a video image in a non-illustrated display unit on the basis of the image data subjected to the contrast correction by the mist correction unit 109, or records and outputs the image data compressed by the compression unit 110 to a non-illustrated storage medium (e.g., a memory card).

The control unit 112 includes a CPU or an ASIC, and controls the photometric evaluation unit 106, the lens control unit 107, the image processing unit 108, the mist correction unit 109, the compression unit 110, and the output unit 111, respectively.

The external I/F unit 113 is an interface which performs, e.g., a power supply switch, a shutter button, or switches for switching of various modes at the time of photographing.

The mist correction unit 109 will now be described. FIG. 2 is a block diagram showing a configuration of the mist correction unit 109 in the first embodiment. In the drawing, thick solid lines indicate flows of the digital video signal, thin solid lines indicate flows of a control signal, and broken lines indicate flows of other signals.

The mist correction unit 109 includes a mist component estimation unit 200, a local histogram generation unit 201, a statistical information calculation unit 202, a correction coefficient calculation unit 203, and a contrast correction unit 204. Each of these units is constituted of hardware such as a CPU, software, or a combination thereof, and controlled by the control unit 112.

The mist component estimation unit 200 as deterioration degree estimation unit estimates a deterioration degree of each pixel in the image data transferred from the image processing unit 108. Here, the deterioration degree is a degree of presence of factors which deteriorate image quality such as contrast or colors in the image data. As the factors which deteriorate the image quality, there are a phenomenon, e.g., haze, fog, mist, or smoke as well as a specific phenomenon in photography, e.g., backlight or flare. The description will be given below on the assumption that the deterioration degrees is a "degree of presence of mist components". However, the following description can be also applied to a case where the image quality is deteriorated due to a phenomenon other than the mist.

The mist component is estimated on the basis of characteristics that the mist has a high luminance and a low saturation, namely, a low contrast or a low color reproduction. That is, a pixel having a high luminance level and a low saturation level is estimated as the mist component.

Figure 3A:
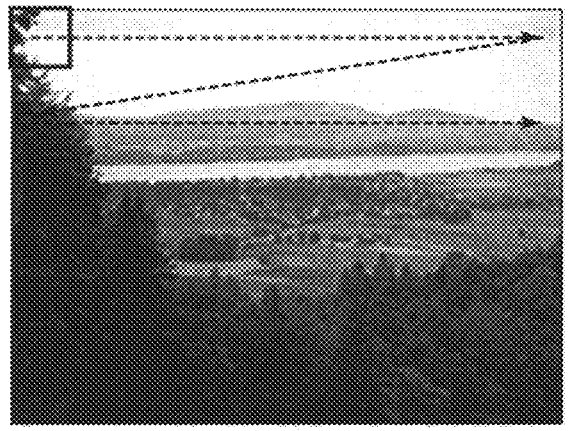
FIG. 3A is a view for explaining a technique to estimate a mist component from an input image.
Figure 3B:
FIG. 3B is a view showing image data of the estimated mist component.

FIG. 3A is a view for explaining a technique to estimate a mist component Hz from an input image I. Furthermore, FIG. 3B is a view showing image data of the estimated mist component Hz. The mist component estimation unit 200 estimates the mist component Hz(x,y) on the basis of an R value, a G value, and a B value of a pixel present in a coordinate (x,y) in the input image I transferred from the image processing unit 108. Here, assuming that the R value, the G value, and the B value in the coordinate (x,y) are Ir, Ig, and Ib respectively, the mist component Hz(x,y) is estimated from the following Expression (1). As shown in FIG. 3A, the estimation shown in Expression (1) is sequentially performed while scanning the input image I in accordance with each pixel. Consequently, an image having the mist component shown in FIG. 3B is provided.

$$Hz(x,y)=\min(Ir,Ig,Ib) \qquad (1)$$

In a region having a high luminance and a low saturation (a region having a large amount of mist in the image), since the R value, the G value, and the B value are equivalent and large, Hz in Expression (1) becomes large. On the other hand, in a region having a low luminance or a high saturation (a region having a small amount of mist in the image), since any one of the R value, the G value, and the B value is small, Hz(x,y) in Expression (1) becomes small. As described above, the mist component Hz (x,y) has characteristics that it has a large value as density of the mist in a scene increases or it has a smaller value as the density of the mist decreases.

Here, to assure spatial continuity of the mist component estimated by Expression (1), low-pass filter processing of a bilateral filter or the like may be applied to the mist component calculated by Expression (1). When the low-pass filter processing is applied, an influence of noise can be eliminated. Moreover, the mist component is not restricted to one which is calculated by Expression (1). That is, an index representing levels of a high luminance and a low saturation can be used as the mist component. For example, a local contrast value, edge intensity, a subject distance, and the like can be also used as the mist components.

The local histogram generation unit 201 generates a luminance histogram of each local region from the image data transferred from the image processing unit 108. Here, general histogram generation is performed by considering a pixel value in a target local region as a luminance value and counting its frequency one by one. On the other hand, in this embodiment, a count value to a pixel value of a neighboring pixel is weighted in accordance with pixel values of a reference pixel and the neighboring pixel in the local region. The count value for the pixel value of the neighboring pixel takes a value falling in the range of, e.g., 0.0 to 1.0.

Figure 4:
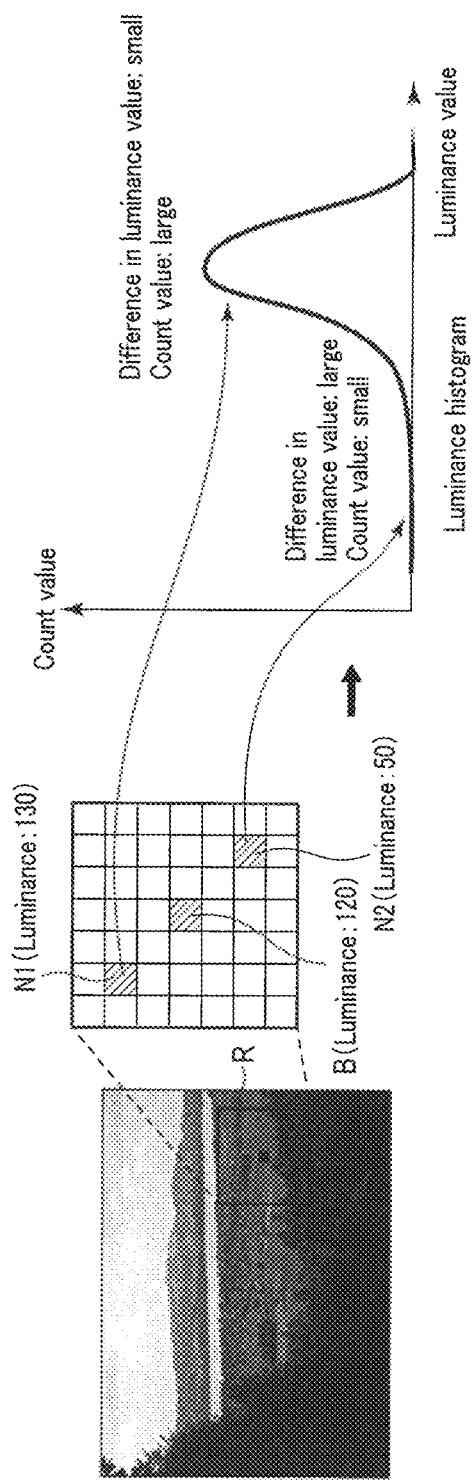
FIG. 4 is a view for explaining a technique to generate a luminance histogram.
Figure 5:
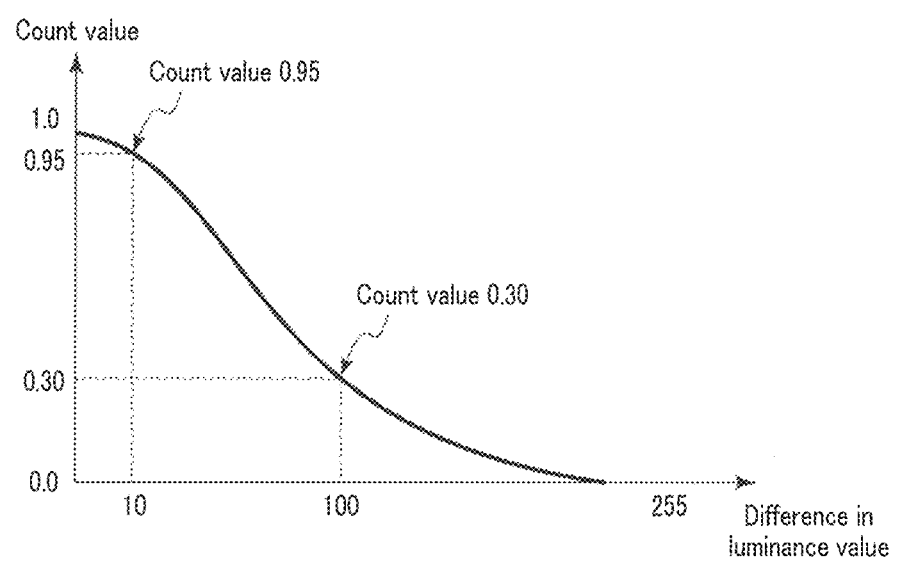
FIG. 5 is a view showing a Gaussian function as an example of generating the luminance histogram.

A technique to generate a luminance histogram will now be specifically described. FIG. 4 is a view for explaining the technique to generate a luminance histogram. In this embodiment, the count value decreases as a difference between the pixel value of the reference pixel and that of the neighboring pixel increases. Such a count value is calculated by using, e.g., such a Gaussian function as shown in FIG. 5.

The technique to generate a luminance histogram will now be specifically described. For example, the reference pixel is set at a central position of a local region R in input image data I shown in FIG. 4. The local region R is a region of, e.g., 7×7 pixels. The reference pixel B is assumed to have, e.g., a pixel (luminance) value (120). Further, a neighboring pixel N1 which is a pixel in a second row and a second column in the local region R is assumed to have, e.g., a pixel (luminance) value (130). Furthermore, a neighboring pixel N2 which is a pixel in a sixth row and a sixth column in the local region R is assumed to have, e.g., a pixel (luminance) value (50). An absolute value of a difference in pixel value between the reference pixel B and the neighboring pixel N1 is 10, and an absolute value of a difference in pixel value between the reference pixel B and the neighboring pixel N2 is 70. Thus, a count value to the neighboring pixel N1 is close to 1.0 (0.95 in the example in FIG. 5), and a count value to the neighboring pixel N2 is close to 0.0.

The reason why the histogram is calculated in this manner is that it can be estimated that the neighboring pixel having the pixel value greatly different from that of the reference pixel belongs to a region (a different subject) different from that of the reference pixel with high possibility, and that the neighboring pixel having the pixel value slightly different from that of the reference pixel belongs to the same region (the same subject) as that of the reference pixel with high possibility. That is, when a count of the neighboring pixel having the pixel value greatly different from that of the reference pixel is reduced, a local histogram placing importance on the region, to which the reference pixel belongs, is generated.

Here, the count value does not have to be necessarily determined in accordance with a difference in pixel value between the reference pixel and the neighboring pixel. For example, the count value may be determined in accordance with a difference in a saturation value or mist component between the reference pixel and the neighboring pixel.

Moreover, the count value does not have to be necessarily calculated by using the Gaussian function. That is, it is good enough to determine the count value so that it decreases as a difference in each of various kinds of values between the reference pixel and the neighboring pixel increases. Thus, for example, a lookup table or a polygonal-line-approximated table may be used for determination of the count value.

Additionally, when a difference in each of various kinds of values between the reference pixel and the neighboring pixel is compared with a threshold value and it is equal to or higher than the threshold value, the count value of the neighboring pixel may be decreased (e.g., decreased to 0.0).

Further, the local histogram generation unit 201 does not have to necessary count a frequency of each pixel value. For example, the local histogram generation unit 201 may count the R value, the G value, and the B value, respectively. Furthermore, the local histogram generation unit 201 may count the G value as a luminance value.

The statistical information calculation unit 202 calculates a representative luminance based on statistical information of the luminance histogram transferred from the local histogram generation unit 201. The representative luminance is, e.g., a luminance of a low luminance portion, a luminance of a high luminance portion, or a luminance of an intermediate luminance portion in an effective luminance range in the luminance histogram. The luminance of the low luminance portion is, e.g., a minimum luminance in the effective luminance range. The luminance of the high luminance portion is, e.g., a maximum luminance in the effective luminance range. The luminance of the intermediate luminance portion, e.g., a centroid luminance. The minimum luminance is a luminance whose cumulative frequency is 5% of a maximum value in a cumulative histogram created from the luminance histogram. The maximum luminance is a luminance whose cumulative frequency is 95% of the maximum value in the cumulative histogram created from the luminance histogram. The centroid luminance is a luminance whose cumulative frequency is 50% of the maximum value in the cumulative histogram created from the luminance histogram. 5%, 50%, and 95% which are percentages of the cumulative frequency corresponding to the minimum luminance, the maximum luminance, and the centroid luminance may be arbitrarily changed. Further, the luminance of the intermediate luminance portion is determined as the centroid luminance in the cumulative histogram, but the centroid luminance does not have to be necessarily calculated from the cumulative frequency. For example, the luminance of the intermediate luminance portion may be a luminance having a maximum frequency, an intermediate value, or an average value in the luminance histogram.

The correction coefficient calculation unit 203 calculates a correction coefficient to correct contrast in the local region on the basis of the mist component transferred from the mist component estimation unit 200 and the statistical information transferred from the statistical information calculation unit 202. For example, assuming that the contrast correction is performed by histogram stretching, the correction coefficient calculation unit 203 calculates a coefficient for the histogram stretching by using the centroid luminance and the maximum luminance in the statistical information. Here, the histogram stretching is processing to emphasize the contrast by expanding the effective luminance range of the histogram.

Figure 6A:
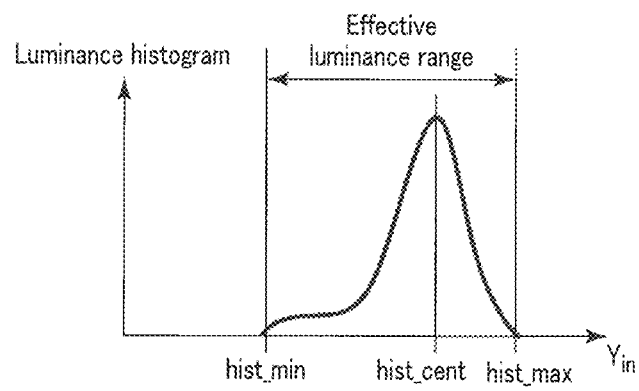
FIG. 6A is a view showing a histogram before stretching for explaining histogram stretching.
Figure 6B:
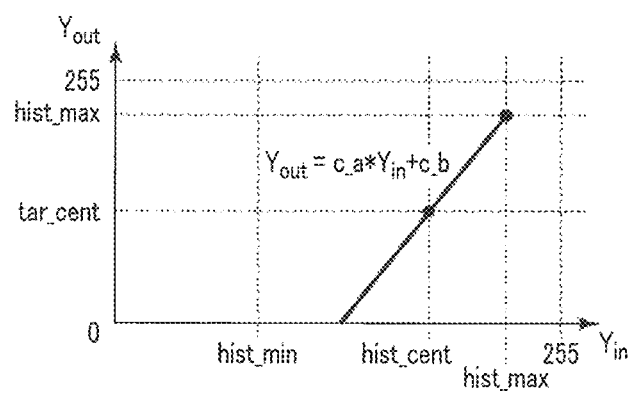
FIG. 6B is a view showing a correction coefficient for explaining the histogram stretching.
Figure 6C:
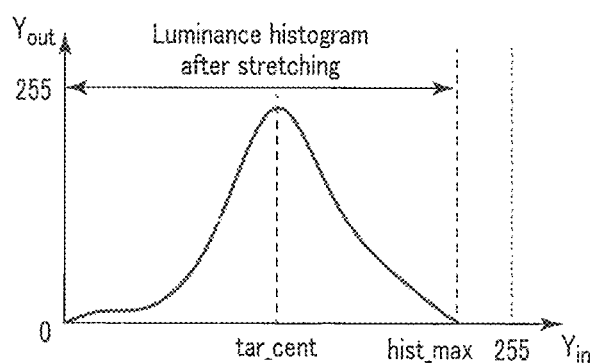
FIG. 6C is a view showing a histogram after stretching for explaining the histogram stretching.

FIG. 6A, FIG. 6B, and FIG. 6C are views for explaining the histogram stretching in this embodiment. Here, FIG. 6A is a view showing a histogram before stretching. Additionally, FIG. 6B is a view showing a correction coefficient calculated by the correction coefficient calculation unit 203. Further, FIG. 6C is a view showing a histogram after stretching.

In the histogram shown in FIG. 6A, the minimum luminance is represented as hist_min, the maximum luminance is represented as hist_max, and the centroid luminance is represented as hist_cent. The correction coefficient calculation unit 203 in this embodiment calculates, e.g., the correction coefficient to perform linear transform which expands the centroid luminance hist_cent to a target centroid luminance tar_cent while maintaining the maximum luminance hist_max. Assuming that c_a is a tilt in a linear transform expression shown in FIG. 6B and c_b is an intercept in the linear transform expression, c_a and c_b are represented by, e.g., the following Expression (2). The histogram shown in FIG. 6A is stretched in accordance with Expression (2). The stretched histogram is shown in FIG. 6C.

$$c\_a = \frac{hist\_max - tar\_cent}{hist\_max - hist\_cent} \quad (2)$$

$$c\_b = tar\_cent - c\_a \cdot hist\_cent$$

where $Y_{in}$ of an axis of abscissa in the linear transform expression shown in FIG. 6B represents luminance data of an input image, and $Y_{OUT}$ of an axis of ordinate represents luminance data of an output image (after the contrast correction). Further, the target centroid luminance tar_cent shown in Expression (2) is a value smaller than the original centroid luminance hist_cent calculated from the cumulative histogram, and can be calculated by the following Expression (3) in accordance with, e.g., a value of the mist component.

$$tar\_cent(x,y) = hist\_cent(x,y) - A \cdot Hz(x,y)/Hz\ max \quad (3)$$

where Hz (x,y) in Expression (3) represents a value of the mist component in the coordinate (x,y), and Hzmax represents a maximum value of the mist component to the entire image. Furthermore, A represents a predetermined adjustment parameter. As the maximum value Hzmax of the mist component, a predetermined fixed value may be used rather than a maximum value calculated from the image. Moreover, although Expression (3) is constituted of a linear expression, and it may be constituted of a non-linear expression without being restricted to this configuration.

Figure 7A:
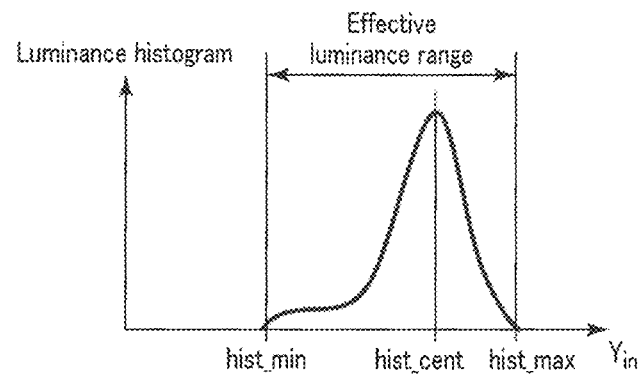
FIG. 7A is a view showing a histogram before stretching when a value of a mist component is high.
Figure 7B:
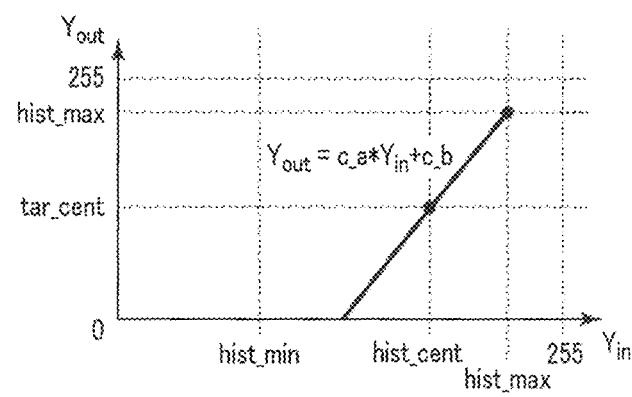
FIG. 7B is a view showing a correction coefficient when the value of the mist component is high.
Figure 7C:
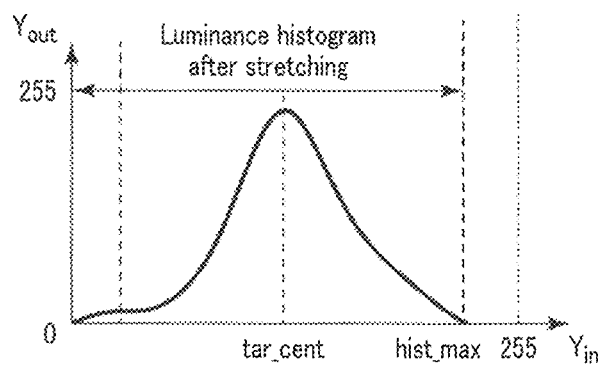
FIG. 7C is a view showing a histogram after stretching when the value of the mist component is high.
Figure 8A:
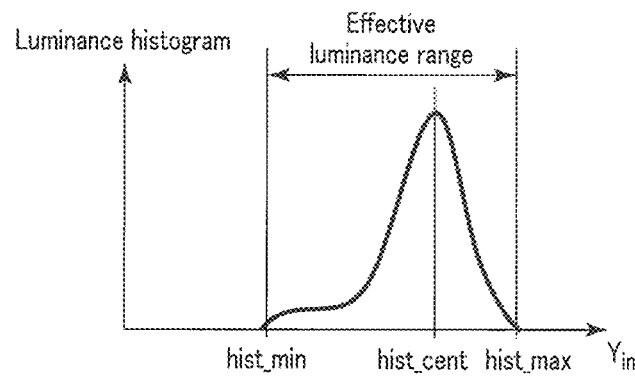
FIG. 8A is a view showing a histogram before stretching when the value of the mist component is low.
Figure 8B:
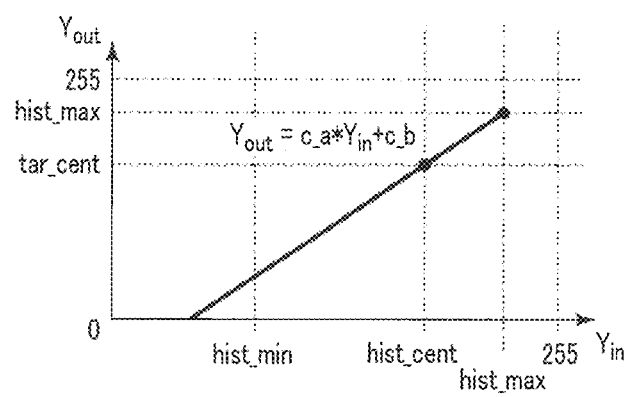
FIG. 8B is a view showing a correction coefficient when the value of the mist component is low.
Figure 8C:
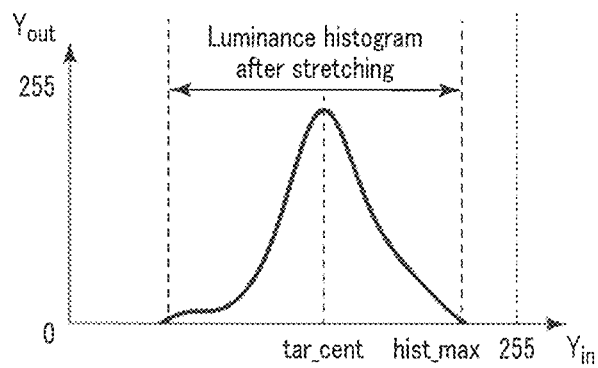
FIG. 8C is a view showing a histogram after stretching when the value of the mist component is low.

FIG. 7A, FIG. 7B, and FIG. 7C show a histogram before stretching, a correction coefficient, and a histogram after stretching when a value of the mist component is large, respectively. Additionally, FIG. 8A, FIG. 8B, and FIG. 8C show a histogram before stretching, a correction coefficient, and a histogram after stretching when a value of the mist component is small, respectively.

As can be understood from Expression (3), the target centroid luminance tar_cent shifts toward a low luminance side as the value of the mist component increases. That is, as a result of the linear transform using Expression (3), the luminance histogram of the local region is stretched toward the low luminance side while maintaining the maximum luminance in the effective luminance range as the value of the mist component increases. In a region having high mist density in an image, a possibility that the local histogram is biased toward a high luminance side in a narrow effective luminance range is high. Thus, in the local region having the high mist density, when such histogram stretching as shown in FIG. 7C is performed to shift the centroid luminance toward the low luminance side, the contrast in the local region is improved. On the other hand, when the value of the mist component is small, since a difference between the target centroid luminance and the original centroid luminance is small, the histogram stretching is not substantially performed as shown in FIG. 8C. Consequently, a fluctuation in the luminance is suppressed.

According to a technique using a model system for a mist image in a conventional technology, a value of airglow is subtracted in accordance with a magnitude of the value of the mist component. Thus, even in a region having no mist, for example, if a white subject is present in the region, large correction is applied. Consequently, a luminance of the white subject is considerably lowered. On the other hand, according to the technique of this embodiment, the maximum luminance of the histogram is held by the histogram stretching using the centroid luminance. Thus, a fluctuation in the luminance of the white subject on the high luminance side becomes relatively small in the local region.

Here, in the above example, a correction coefficient such that the centroid luminance hist_cent becomes the target centroid luminance tar_cent is calculated while holding the maximum luminance hist_max in the histogram. However, the technique to calculate the correction coefficient is not restricted to this configuration. For example, a target maximum luminance tar_max is set to the maximum luminance in the histogram, and the correction coefficient can be calculated by the arithmetic operation of Expression (2) using this maximum luminance tar_max. In this case, hist_max in a numerator in Expression (2) is replaced with tar_max, and it is desirable for a fluctuation amount from hist_max to tar_max to be relatively smaller than a fluctuation amount from hist_cent to tar_cent. The target maximum luminance tar_max may be higher than the maximum luminance tar_max.

Further, the linear transform expression is used for the histogram stretching in the above example, but the present invention is not restricted thereto. A non-linear transform expression or a table using polygonal line approximation can be also used for the histogram stretching. Furthermore, the transform expression running through both the maximum luminance and the centroid luminance is used in the above example, but the transform expression does not have to be necessary a transform expression which runs through both the maximum luminance and the centroid luminance as long as it is a transform expression which runs through the maximum luminance and shifts a luminance portion other than the maximum luminance toward the low luminance side. The transform expression may run through the maximum luminance, the centroid luminance, the minimum luminance. For example, a target minimum luminance is set to the minimum luminance in the histogram, and the correction coefficient can be calculated by the arithmetic operation of Expression (2) using this minimum luminance. Since the minimum value is shifted to a low luminance side, the target minimum luminance is lower than the minimum value.

Moreover, the contrast correction is performed by the histogram stretching in the above example, but the present invention is not restricted thereto. For example, even if the contrast correction is performed by the histogram equalization, the technology of this embodiment can be applied.

The contrast correction unit 204 performs the contrast correction to an input image transferred from the image processing unit 108 on the basis of the correction coefficient transferred from the correction coefficient calculation unit 203. An arithmetic expression for the contrast correction is represented by Expression (4).

$$Y_{out}=(1.0-s_t)*Y_{in}+s_t \cdot Y_t$$

$$Y_t=c\_a \cdot Y_{in}+c\_b \quad (4)$$

where, as described above, $Y_{in}$ represents luminance data (a pixel value) of the input image, and $Y_{out}$ represents luminance data (a pixel value) after the contrast correction. Additionally, $s_t$ is a coefficient representing correction intensity to an entire image and can be appropriately set in the range of 0.0 to 1.0. As a value of $s_t$ increases, more intensive contrast correction is applied. Further, $Y_t$ is target luminance data after the correction calculated by using the correction coefficient output from the correction coefficient calculation unit 203. As represented by Expression (4), the luminance $Y_{out}$ after the contrast correction has a value provided by synthesizing the input luminance $Y_{in}$ and the target luminance $Y_t$ in accordance with a magnitude of the correction intensity $s_t$.

Figure 9:
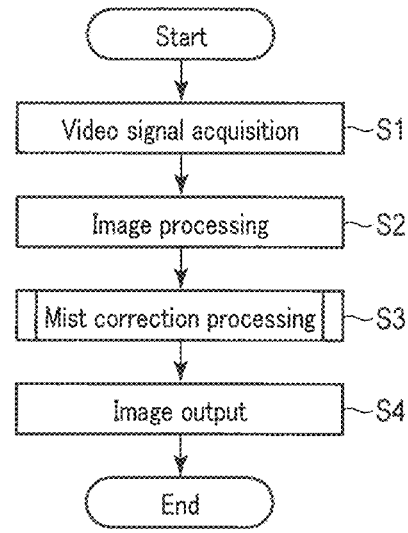
FIG. 9 is a flowchart showing a photographing operation using an imaging apparatus.

A photographing operation using the imaging apparatus according to this embodiment will now be described. FIG. 9 is a flowchart showing a photographing operation using the imaging apparatus 1. It is to be noted that the photographing operation will be described herein, but mist correction processing described below can be also applied at the time of, e.g., live view display before photography.

For example, the processing of FIG. 9 is started by an operation of a shutter button effected by a user. When the operation of the shutter button is detected through the external I/F unit 113, the control unit 112 starts the photographing operation of the imaging sensor 102 in accordance with an exposure time calculated by the photometry evaluation unit 106 at step S1. At this time, the imaging sensor 102 receives an optical image from the lens system 100, and outputs an analog video signal. The A/D converter 104 converts the analog video signal provided by the imaging sensor 102 into a digital video signal, and transfers this digital video signal to the buffer 105. The control unit 112 inputs the digital video signal transferred to the buffer 105 to the image processing unit 108.

At step S2, the image processing unit 108 performs image processing, e.g., well-known interpolation processing, white balance correction processing, noise reduction processing, or the like to the acquired digital video signal to generate image data, and transfers this image data to the buffer 105. The control unit 112 inputs the image data, which has been transferred to the buffer 105, to the mist correction unit 109.

At step S3, the mist correction unit 109 performs mist correction processing to the image data provided by the image processing in the image processing unit 108, and transfers the mist-corrected image data to the buffer 105. Details of the mist correction processing will be described later.

At step S4, the control unit 112 carries out image data output processing. That is, the control unit 112 transfers the image data, which has been transferred to the buffer 105, to the compression unit 110. The compression unit 110 performs compression processing, e.g., JPEG compression or MPEG compression to the image data subjected to the mist correction processing by the mist correction unit 109. Then, the control unit 112 adds header information including a photographing date, photographing conditions, and the like to the image data compressed by the compression unit 110 to create an image file. Furthermore, the control unit 112 records the image file in a memory card or the like through the output unit 111. Moreover, the control unit 112 transfers the image data, which has been transferred to the buffer 105, to the display unit through the output unit 111. Upon receiving this data, the display unit displays an image based on the image data. Additionally, the processing of FIG. 9 is terminated.

Figure 10:
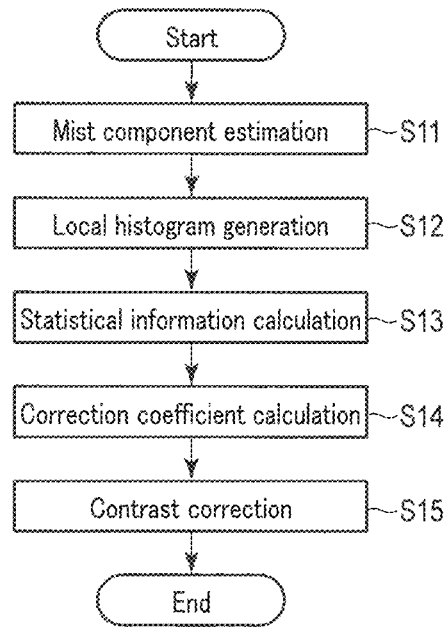
FIG. 10 is a flowchart showing mist correction processing.

FIG. 10 is a flowchart showing the mist correction processing. At step S11, the mist component estimation unit 200 estimates a mist component of each pixel in the input image data. Further, the mist component estimation unit 20 transfers each estimated mist component to the local histogram generation unit 201 and the correction coefficient calculation unit 203.

At step S12, the local histogram generation unit 201 generates a histogram of each local region. As described above, at the time of generating the histogram, a count value to a pixel value of a neighboring pixel is weighted in accordance with a difference in pixel value (luminance value) between a reference pixel and the neighboring pixel in the local region. After generating the histogram, the local histogram generation unit 201 transfers the generate luminance histogram to the statistical information calculation unit 202.

At step S13, the statistical information calculation unit 202 calculates statistical information from the histogram of each local region. As described above, the statistical information is, e.g., a minimum luminance, a maximum luminance, and a centroid luminance in an effective luminance range. Further, the statistical information calculation unit 202 transfers the calculated statistical information to the correction coefficient calculation unit 203.

At step S14, the correction coefficient calculation unit 203 sets correction coefficients c_a and c_b from Expressions (2)

and (3) on the basis of the mist component estimated in the mist component estimation unit 200 and the statistical information calculated in the statistical information calculation unit 202. Furthermore, the correction coefficient calculation unit 203 transfers the correction coefficients c_a and c_b to the contrast correction unit 204.

At step S15, the contrast correction unit 204 performs the contrast correction to the input image data on the basis of the correction coefficients c_a and c_b transferred from the correction coefficient calculation unit 203. Thus, the processing in FIG. 10 is terminated.

Figure 11A:
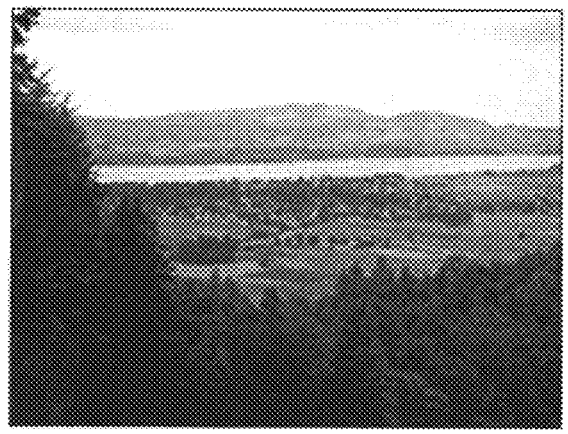
FIG. 11A is a view showing an image before contrast correction.
Figure 11B:
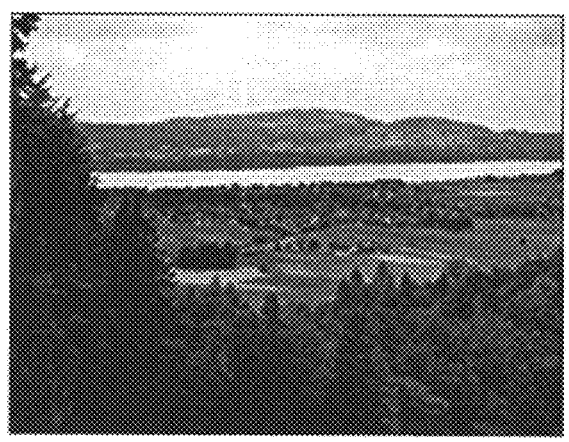
FIG. 11B is a view showing an image after the contrast correction.

FIG. 11A and FIG. 11B are views comparing images before and after the contrast correction. FIG. 11A is a view showing an input image before the contrast correction. FIG. 11B is a view showing an image after the contrast correction. In the contrast correction according to this embodiment, since the contrast correction to maintain a high luminance side is performed in accordance with a mist component, a region of mist alone is removed, and the excessive contrast correction can be prevented from being applied to a region of a river which is a subject with a high luminance.

As described above, in the first embodiment, the mist component in the input image data is estimated, and the correction coefficients for the contrast correction are calculated so that the high luminance side in the input image data is left and contrast of any other portion is changed in accordance with the estimated mist component. Consequently, the excessive contrast correction can be prevented from being applied to a white subject with the high luminance which is not mist, and the mist alone can be removed. That is, since the white subject with the high luminance has a substantially uniform luminance value and the high luminance with high possibility, the contrast correction to keep the high luminance side can reduce a possibility that the contrast of the subject with the high luminance is lost. Consequently, a high-grade image having improved visibility can be provided. Such an effect can be provided not only in recording of an image but also in e.g., contrast AF or recognition processing of subject.

Second Embodiment

A second embodiment according to the present invention will now be described with reference to the drawings. Here, a part different from the first embodiment will be mainly described below, and a description on the same part will be omitted.

Figure 12:
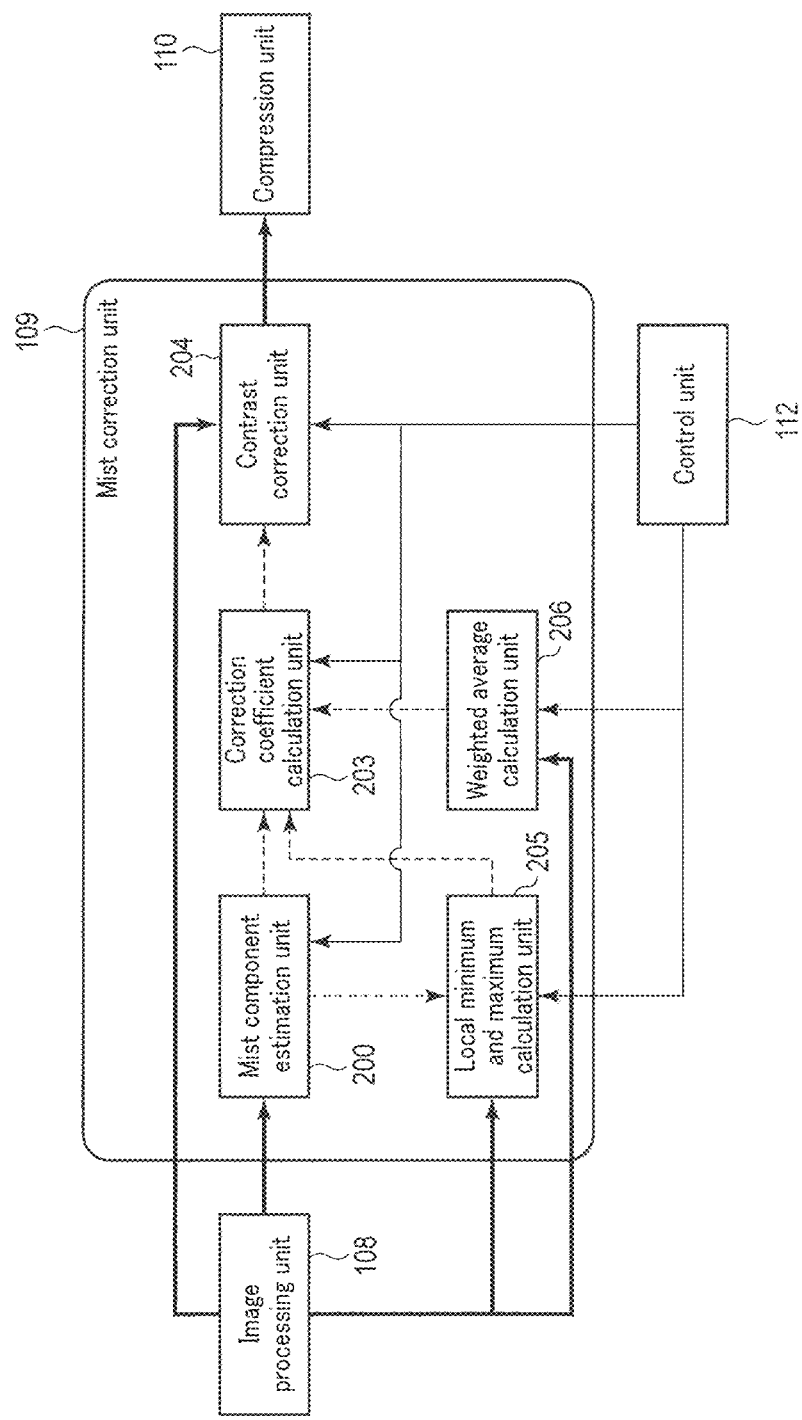
FIG. 12 is a block diagram showing a configuration of a mist correction unit in a second embodiment.

FIG. 12 shows a block diagram of a mist correction unit 109 according to a second embodiment. The mist correction unit 109 includes a local minimum and maximum calculation unit 205 and a weighted average calculation unit 206 in place of the local histogram generation unit 201 and the statistical information calculation unit 202.

To the local minimum and maximum calculation unit 205 are transferred input image data from an image processing unit 108 as well as a mist component from a mist component estimation unit 200. The local minimum and maximum calculation unit 205 scans pixel values in the input image data of each local region, and calculates a minimum luminance and a maximum luminance of each local region. Moreover, the local minimum and maximum calculation unit 205 transfers the minimum luminance and the maximum luminance to the correction coefficient calculation unit 203. At the time of calculating the minimum luminance and the maximum luminance, the local minimum and maximum calculation unit 205 excludes a neighboring pixel having a large difference in pixel value from that of a reference pixel from scanning targets so that the minimum luminance and the maximum luminance can be detected from a region to which the reference pixel belongs. For example, a difference between a mist component of the reference pixel and a mist component of the neighboring pixel is used. It is to be noted that the local minimum and maximum calculation unit 205 may be configured to search for the minimum luminance and the maximum luminance from pixel values subjected to noise removal by, e.g., a low-pass filter in place of excluding the neighboring pixel having a large difference in pixel value from the scanning targets.

The input image data is transferred to the weighted average calculation unit 206 from the image processing unit 108. The weighted average calculation unit 206 applies a weighted average filter based on the reference pixel in the local region to calculate a representative luminance to the local region. This weighted average filter is a filter such that a weight to the neighboring pixel having a large difference in pixel value from that of the reference pixel is reduced. Additionally, the weighted average calculation unit 206 transfers the calculated representative luminance to a correction coefficient calculation unit 203.

A configuration of the correction coefficient calculation unit 203 is basically the same as that described in the first embodiment. However, in the second embodiment, the maximum luminance calculated by the local minimum and maximum calculation unit 205 is adopted as the maximum luminance used in Expression (2), and the representative luminance calculated by the weighted average calculation unit 206 is adopted as the centroid luminance.

In the foregoing embodiment, even if a histogram is not calculated, the same effect as that of the first embodiment can be exerted.

Although the present invention has been described on the basis of the embodiments, the present invention is not restricted to the foregoing embodiments, and various modifications or applications can be made within a scope of a gist of the present invention as a matter of course. For example, in the foregoing embodiments, the correction coefficient is calculated to all pixels in the input image data. However, the correction coefficient may be calculated from, e.g., the input image data subjected to reduction resizing. When the correction coefficient is calculated from the input image data subjected to the reduction resizing, an effect to reduce a processing load and avoid an influence of noise can be expected.

Further, each processing in the foregoing embodiments can be stored as a program which can be executed by the control unit 112 which is a computer. Besides, it can be stored in a storage medium of an external storage device such as a magnetic disk, an optical disk, or a semiconductor memory, and distributed in this form. Furthermore, the control unit 112 reads a program stored in this storage medium of the external storage device, and the above-described processing can be executed by controlling an operation by this read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that improves quality of image data, comprising:

a memory configured to store image data; and
an image processor communicatively coupled to the memory and configured to:
retrieve the image data from the memory,
estimate a deterioration degree of each local region of the image data,
calculate a difference of pixel values of a reference pixel and a neighboring pixel of each local region of the image data and,
calculate a count value in a range of 0 to 1 by applying a weight coefficient to the calculated difference of pixel values that results in the count value decreasing as the calculated difference of pixel values increases, and generate a luminance histogram,
calculate statistical information of each local region of the image data based on the luminance histogram,
calculate at least a luminance of a high luminance portion in a luminance distribution of the image data from statistical information of each local region of the image data,
calculate a correction coefficient to perform contrast correction which shifts a luminance other than a luminance of the high luminance portion to a low luminance side, while suppressing a fluctuation in the luminance of the high luminance portion in accordance with the deterioration degree of each local region estimated,
perform contrast correction for each local region of the image data based on the correction coefficient calculated; and
generate a contrast corrected image.

2. The image processing apparatus according to claim 1, wherein the image processor is further configured to:
calculate an intermediate luminance portion in the luminance distribution of the image data from the statistical information of each local region, and
calculate the correction coefficient based on the luminance of the high luminance portion and a luminance of the intermediate luminance portion.

3. The image processing apparatus according to claim 2, wherein the image processor calculates the correction coefficient to set the luminance of the intermediate luminance portion to a target luminance.

4. The image processing apparatus according to claim 3, wherein the image processor sets the target luminance in accordance with the deterioration degree.

5. The image processing apparatus according to claim 4, wherein the image processor sets the target luminance whose value decreases as the deterioration degree increases.

6. The image processing apparatus according to claim 3, wherein a value of the target luminance is smaller than a value of the luminance of the intermediate luminance portion.

7. The image processing apparatus according to claim 1, wherein the image processor is further configured to:
calculate an intermediate luminance portion and a low luminance portion in the luminance distribution of the image data from the statistical information of each local region, and
calculate the correction coefficient based on the luminance of the high luminance portion, a luminance of the intermediate luminance portion, and a luminance of the low luminance portion.

8. The image processing apparatus according to claim 7, wherein the image processor calculates the correction coefficient so that the luminance of the intermediate luminance portion is set as a first target luminance and the luminance of the low luminance portion is set as a second target luminance.

9. The image processing apparatus according to claim 8, wherein the image processor sets the first target luminance and the second target luminance in accordance with the deterioration degree.

10. The image processing apparatus according to claim 9, wherein the image processor sets the first target luminance and the second target luminance each having a value which decreases as the deterioration degree increases.

11. The image processing apparatus according to claim 8, wherein the value of the first target luminance is smaller than a value of the luminance of the intermediate luminance portion, and the value of the second target luminance is smaller than a value of the luminance of the low luminance portion.

12. The image processing apparatus according to claim 2, wherein the image processor calculates at least the high luminance portion and the intermediate luminance portion from a luminance histogram of each local region.

13. The image processing apparatus according to claim 12, wherein the high luminance portion has the luminance which is higher than a luminance of the intermediate luminance portion in an effective luminance range of the luminance histogram.

14. The image processing apparatus according to claim 13, wherein the intermediate luminance portion has a centroid luminance in the effective luminance range of the luminance histogram.

15. The image processing apparatus according to claim 13, wherein the intermediate luminance portion has a luminance of a maximum frequency in the effective luminance range of the luminance histogram.

16. The image processing apparatus according to claim 13, wherein the intermediate luminance portion has an intermediate value or an average value in the effective luminance range of the luminance histogram.

17. The image processing apparatus according to claim 2, wherein the image processor calculates the intermediate luminance portion from a weighted average of each local region.

18. An imaging system comprising the image processing apparatus according to claim 1, and further comprising:
an imager that images a subject and generates a video signal concerning the subject;
wherein the image processor performs image processing to the video signal to generate image data and stores the image data in the memory.

19. An image processing method that improves quality of image data, comprising:
retrieving, by an image processor, the image data from a memory;
estimating, by the image processor, a deterioration degree of each local region of the image data;
calculating, by the image processor, a difference of pixel values of a reference pixel and a neighboring pixel of each local region of the image data;
calculating, by the image processor, a count value in a range of 0 to 1 by applying a weight coefficient to the calculated difference of pixel values that results in the count value decreasing as the calculated difference of pixel values increases, and generating a luminance histogram;

calculating, by the image processor, statistical information of each local region of the image data based on the luminance histogram;

calculating, by the image processor, at least a luminance of a high luminance portion in a luminance distribution of the image data from statistical information of each local region of the image data;

calculating, by the image processor, a correction coefficient to perform contrast correction which shifts a luminance other than a luminance of the high luminance portion to a low luminance side, while suppressing a fluctuation in the luminance of the high luminance portion in accordance with the deterioration degree of each local region estimated;

performing, by the image processor, the contrast correction for each local region of the image data based on the correction coefficient calculated; and generating a contrast corrected image.

20. A computer-readable non-transitory storage medium that stores instructions for improving quality of image data, the instructions when executed by an image processor cause the image processor to:

retrieve the image data from a memory;

estimate a deterioration degree of each local region of the image data;

calculate a difference of pixel values of a reference pixel and a neighboring pixel of each local region of the image data;

calculate a count value in a range of 0 to 1 by applying a weight coefficient to the calculated difference of pixel values that results in the count value decreasing as the calculated difference of pixel values increases, and generate a luminance histogram;

calculate statistical information of each local region of the image data based on the luminance histogram;

calculate at least a luminance of a high luminance portion in a luminance distribution of the image data from statistical information of each local region of the image data;

calculate a correction coefficient to perform contrast correction which shifts a luminance other than a luminance of the high luminance portion to a low luminance side, while suppressing a fluctuation in the luminance of the high luminance portion in accordance with the deterioration degree of each local region estimated;

perform the contrast correction for each local region of the image data based on the correction coefficient calculated and generating a contrast corrected image.

21. The image processing apparatus according to claim 1, wherein the weight coefficient is a Gaussian function.

* * * * *